United States Patent

[11] 3,631,431

[72] Inventor Jay A. Cox
Rolling Hills Estates, Calif.

[21] Appl. No. 828,247
[22] Filed May 27, 1969
[45] Patented Dec. 28, 1971
[73] Assignee Gulton Industries, Inc.
Metuchen, N.J.

[54] EVENT-MONITORING SYSTEM
11 Claims, 10 Drawing Figs.

[52] U.S. Cl. .......... 340/213, 340/174 WB
[51] Int. Cl. .......... G08b 25/00
[50] Field of Search .......... 340/166, 168, 181, 213, 174 WB, 412 (413)

[56] References Cited

UNITED STATES PATENTS

| | | | |
|---|---|---|---|
| 2,962,704 | 11/1960 | Buser | 340/347 |
| 3,108,262 | 10/1963 | Saba | 340/213 |
| 3,132,335 | 5/1964 | Kahn | 307/88 |
| 3,270,322 | 8/1966 | Ledoux et al. | 340/166 C |
| 3,417,257 | 12/1968 | Michaelis | 307/88 |

*Primary Examiner*—John W. Caldwell
*Assistant Examiner*—Robert J. Mooney
*Attorney*—Wallenstein, Spangenberg, Hattis & Strampel

ABSTRACT: An event-monitoring system including saturable core devices having respective separate saturable cores most desirably each carrying a biasing winding and a scanning winding, the biasing windings being connected in series with one another and the scanning windings being connected in series with one another. The biasing windings of the saturable core devices have different numbers of turns so an instantaneous predetermined magnitude of biasing current will saturate the cores to progressively increasing degrees. The series connected scanning windings receive a scanning current of progressively increasing value, which most advantageously have an AC component superimposed thereon, to develop an oppositely directed progressively increasing electromagnetic field sequentially to unsaturate the cores at predetermined current values normally to cause sequential electrical output signals to be generated thereby, the interval during which unsaturation occurs being a large number of cycles at the modulating frequency. Associated condition-responsive switch means are connected to each saturable core device, such as across each scanning windings, or preferably across a separate isolation winding, so closure of the switch means will prevent the generation of said output signal.

INVENTOR
JAY A. COX by: Wallenstein, Spangenberg, Hattis & Strampel ATTYS.

INVENTOR
JAY A. COX
by: Wallenstein & Spangenberg, Hattis & Strampel
ATTYS.

INVENTOR
JAY A. COX by: Wallenstein, Spangenberg,
Hattis & Strampel ATTYS.

INVENTOR
JAY A. COX by: Wallenstein, Spangenberg, Hattis & Strampel ATTYS.

EVENT-MONITORING SYSTEM

This invention relates to an event-monitoring system for displaying the normal and abnormal conditions of a large number of devices or conditions being monitored.

The event-monitoring system of this invention has its most useful application in systems wherein the connections between a central control panel and a large number of condition sensors is made over only a few wires. This invention has its most important (but not its only) utility of sensing and displaying the circuit-opening and circuit-closing conditions of switching means such as relay contacts and electronic switches representing normal and abnormal conditions of the devices of conditions being monitored.

One such event-monitoring system of the prior art is based on a single series loop of switches, as in the case of burglar alarms, all of which are closed to indicate that all doors and/or windows of a particular building located remote from a readout panel are secured shut. In this system, a door or window which becomes open will cause one of the switches to be actuated to an open condition thus energizing a warning or alarm device at the central location to indicate that a door or window has been opened. However, this type of prior art system is not capable of indicating which particular door or window is opened. Other types of prior art event monitoring systems provide a separate indication of the condition of each of a plurality of variables being monitored, but these systems which operate with a simple circuit opening or circuit closing condition-responsive means require at least one line for each condition-responsive switch within the system.

Accordingly, an object of this invention is to provide an electrical event-monitoring system for sensing normal and abnormal states or conditions of a plurality of condition responsive means which can comprise simple circuit opening or circuit closing switches indicating the normal and abnormal states of the variables or conditions being monitored and wherein a minimum number of lines are required for connecting a monitoring station to the condition-responsive means to display the information of the conditions of all the variable or conditions being monitored.

Another object of this invention is to provide a monitoring system as described which can operate over long distances with a minimum of interference from noise and other unwanted signals.

Still another object of this invention is to provide a monitoring system, as described, which for a given degree of reliability can be made at minimum cost.

In accordance with this invention, there is associated with each condition-responsive switch means a saturable core device including a saturable core preferably having a rectangular characteristic and having biasing and scanning windings wound on a common saturable core. In the preferred form of this invention each core may include an additional winding for connection to the associated condition-responsive switch means. In a less preferred from of this invention the additional winding is omitted and each condition-responsive switch means is positioned across the associated scanning winding. The biasing winding of each core has a different number of turns with respect to the biasing windings of every other core and the various biasing windings are connected in series with one another to receive a biasing current which may by a constant direct current or most advantageously a progressively decreasing direct current to provide at least initially a biasing magnetomotive force which saturates all of the associated cores in degrees depending upon the number of hours in the biasing windings. The scanning windings of the saturable core devices are connected in series with one another to receive a common progressively increasing DC-scaning scanning current, amplitude modulated at a given frequency, to develop a magnetomotive force in each saturable core device opposite in direction to the magnetomotive force produced by the biasing current which sequentially unsaturates the cores, each for in interval where a large number of cycles (e.g., at least about 10–20 cycles) of the modulating frequency occur during the interval each core is unsaturated, the minimum number of cycles being determined by the minimum acceptable signal to noise ratio.

Where the condition-responsive switch means are connected directly across the scanning windings, the operation of a condition responsive switch means to a closed condition bypasses the scanning current so the associated core does not become unsaturated. Where the condition-responsive switch means is connected across an additional winding of the core, the closure of the switch means reflects a short circuit AC impedance across the scanning winding so the winding acts as an almost zero AC impedance as it does where it is saturated. When the scanning current reaches a value which unsaturates a particular core, if the associated condition-responsive switch means is open, a voltage pulse or inductance-indicating signal (e.g., a signal at the modulation frequency) appears across the scanning winding (the latter in the case where the scanning current is amplitude modulated). The presence or absence of a pulse or inductance-indicating indicating signal when the scanning current reaches a given level at which a given core is expected to unsaturate indicates the associated condition-responsive switch means is in an open or closed condition The provision of an amplitude-modulated scanning current increases the distance with which the monitoring system is operable by minimizing interference problems and the effect of line capacitance. Simultaneously increasing scanning current while decreasing the biasing current reduces the maximum scanning current necessary to unsaturate all of the cores which, in turn, reduces the size, cost and power requirements of the cores and current sources feeding the same.

In accordance with the most advantageous form of the invention, the inductive reactance of the various core devices relative to the modulating frequency is made a constant to minimize signal detection problems and to decrease the number of windings needed by progressively increasing the number of turns in the bias windings while progressively decreasing the number of turns in the scanning winding to maintain the same number of windings in each core, and by modulating both the scanning and biasing currents in a manner where the magnetomotive forces produced reinforce one another at the modulating frequency while the DC magnetomotive forces oppose one another. The AC signals produced in the biasing and scanning windings are added together to from a resultant condition-indicating signal.

The above and other objects, features and advantages of this invention will become more fully realized and understood from the following detailed description, taken in conjunction with the claims and accompanying drawings wherein:

Figure 1:
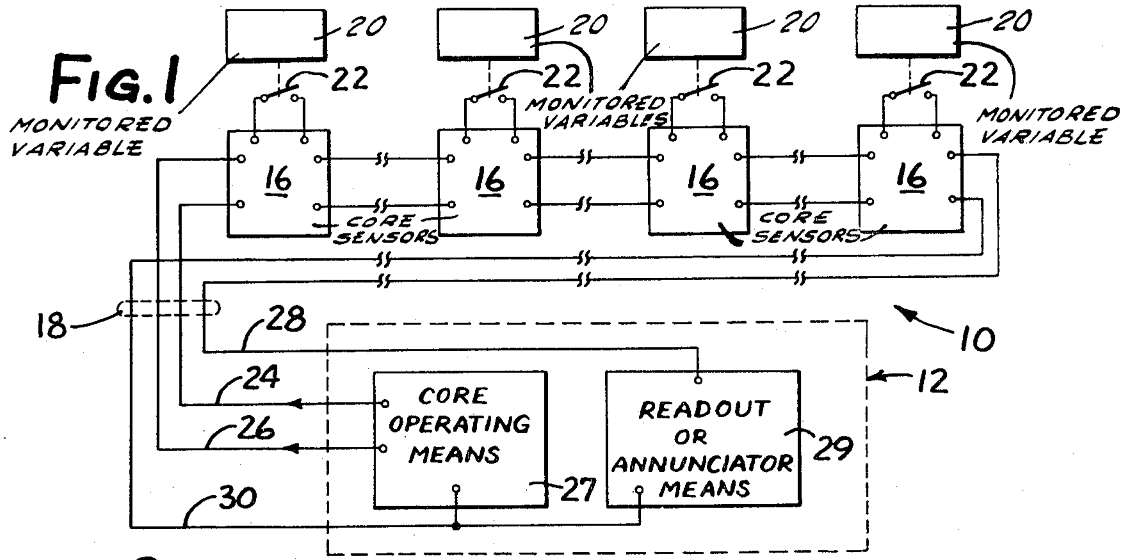
FIG. 1 is a simplified block diagram of an event-monitoring system in accordance with this invention.

Seen in FIG. 1 is a simplified block diagram illustrating the basic components of an event-monitoring system constructed in accordance with this invention. The event-monitoring system is indicated generally by reference numeral 10 and includes a central control station 12 where the control display equipment 27 and 29 are located which equipment energizes and responds to numerous condition-responsive means 22, here shown as switch contacts, which may be spaced many miles from the central control station and connected thereto by wires 24, 26, 28 and 30 in cables 18. Each condition-responsive means may include a switch, like a thermostat switch, pressure switch or limit switch, which has different states for indicating the normal or abnormal condition of a device or other variable 20 being monitored, and saturable magnet core sensors 16 are provided for developing electrical output signals or the like corresponding to the states of the condition-responsive means and occurring at points in time corresponding to various current values of the biasing and/or scanning currents. The unique and novel aspects of this invention enable a relatively large number of condition responsive means 22 (like 100 or more) switches to be monitored with only a total of four or less interconnecting wires connecting all of the condition-responsive means 22 to the central control station 12. (Although four wires are indicated within the cable 18 of FIG. 1, it will be understood that suitable results will be obtained by using three wires, as where, for example, a common conductor is provided between the remote locations and the central control station.) Were the condition-responsive means 22 are switches, the opening and closing thereof by the variable condition or device being monitored act upon the associated sensor 16 to prevent or inhibit the generation of a signal or the change of an electrical characteristic such as, for example, coil inductance. These switches may be relay contacts or electronic switches, or any other circuit-opening and circuit-closing device.

Figure 2:
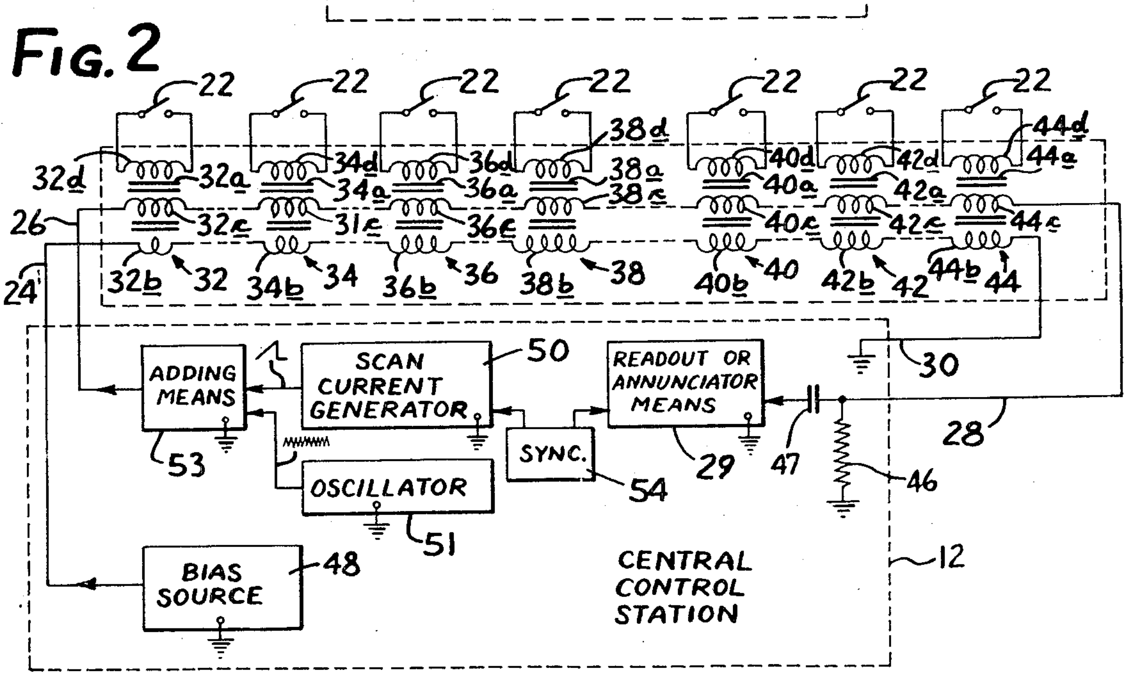
FIG. 2 is a partial schematic and partial block diagram of portions of the event-monitoring system of FIG. 1.

The normal and abnormal states of a variable condition being monitored may be represented by the open and closed conditions of the associated condition-responsive switch 22 (or vice versa). As will appear, the associated saturable magnetic core sensors 16 will produce electrical signals within different reference intervals within each scanning cycle to indicate the normal or abnormal conditions of the variables. The presence or absence of an electrical signal will operate a suitable time and signal responsive readout or annunciator means 29 connected in common with all of the saturable core sensors 16 to indicate which variables are abnormal. Various saturable core-operating currents are fed to one or more windings of the saturable core sensors on one or more lines like 24 and/or 28 by core operating means 27 and the electrical output signals referred to can be coupled to the readout or annunciator means 29 by the same or different lines.

from a better understanding of one of the unique and novel aspects of this invention reference is now made to FIG. 2 wherein the saturable core sensors 16 are indicated schematically. Each of the saturable core sensors is here indicated by reference numerals, 32–44 and include separate cores 32*a*–44*bq*, respectively, and associated biasing windings 32*b*–44 and associated scanning windings 32*c*–44*c*. In accordance with one aspect of this invention, separate switch-isolating windings 32*d*–44*d* are provided on the saturable core devices 32–44, respectively, and the condition-responsive switches 22 are connected across the separate switch-isolating windings. In such case, the DC resistance of the scanning windings remains constant so it doesn't affect the DC component of the scanning current. Also, because of the isolation of the switches 22, the terminals thereof can be grounded. In this embodiment of the invention closure of given condition-responsive switch will provide a short circuit path for the associated switch-isolating winding which, in turn, will provide a reflected short circuit AC impedance across the biasing and scanning windings to inhibit any AC output signal information which would otherwise occur. In effect, the short circuiting of core isolating winding makes the scanning winding appear to be a very low inductive reactance.

Figures 3, 7, 8:
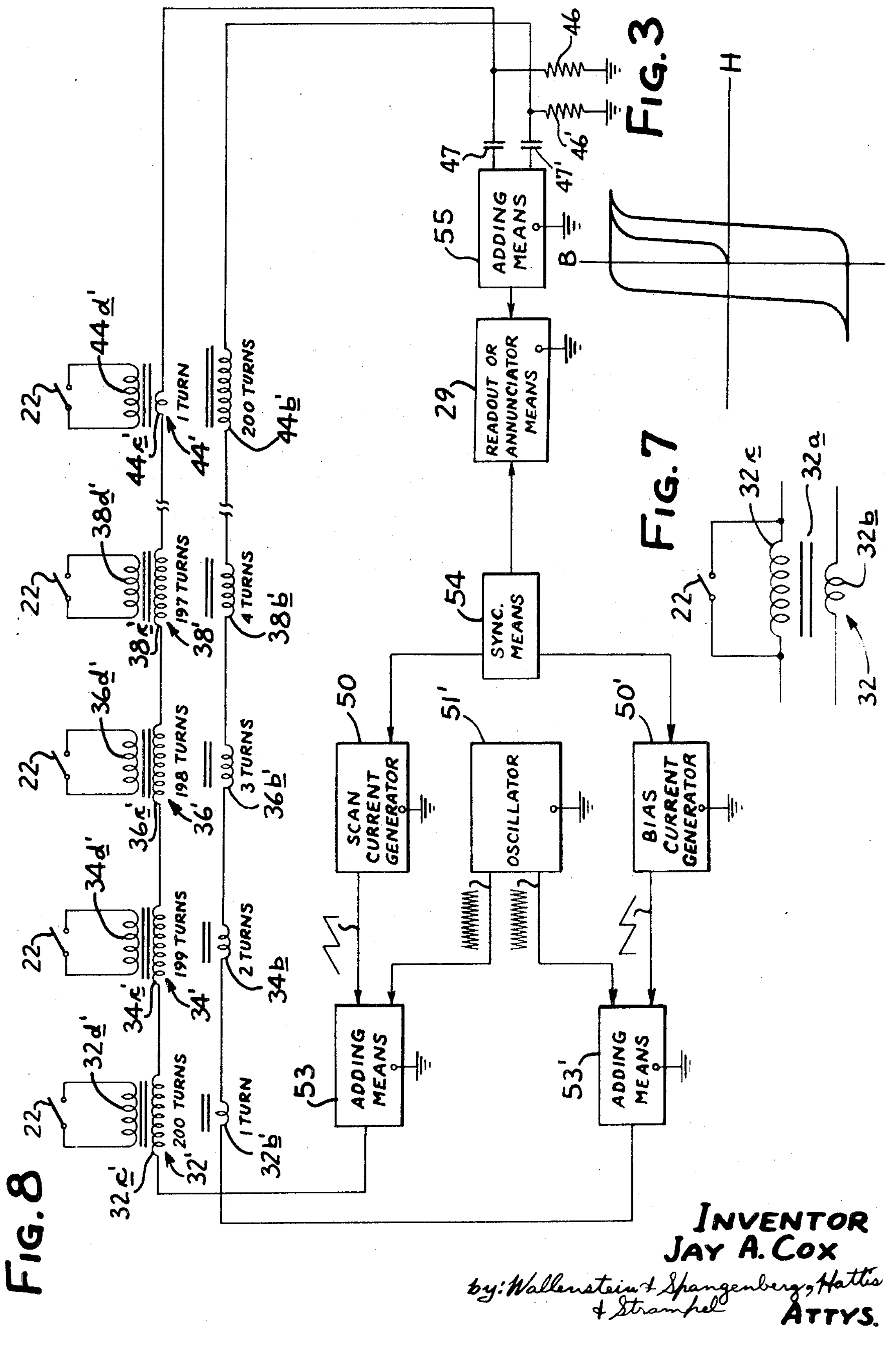
FIG. 3 illustrates a typical hysteresis curve which may be the magnetic characteristic incorporated in the saturable core devices of this invention.
FIG. 7 is a schematic diagram of a single saturable core device illustrating an alternate and preferred form of core device used with this invention.
FIG. 8 illustrates an alternate arrangement of saturable core devices constituting an improved form of this invention where both the scanning and biasing currents are modulated.

The saturable core sensors or devices 32–44 may be of the toroid-type but it is within the contemplation of this invention that saturable core devices of any suitable configuration can be used. The biasing windings 32*b*–44*b* are connected in series one with the other so that a common-biasing current from a bias current source 48 at the central control station 12 will pass through the biasing windings initially to saturate all of the magnetic cores 32*a*–44*a*. The various biasing windings 32*b*–44 have a different number of turns so as to establish in each magnetic core 32*a*–44*a* a different degree of saturation. By way of example, the bias winding 32*b* may have one turn, bias winding 34*b* may have two turns, bias windings 36*b* may have three windings, and so on to the last device which may contain as many windings as there are saturable core devices. The last bias winding 44*b* of the last saturable core device 44 is connected to the central control station 12 via a line 30. The scanning windings 32*c*–44*c*, which in this particular embodiment are assumed to have the same number of windings, are also connected in series one with the other for receiving a progressively increasing scanning current from a scan current generator 50 located at the central control station 12. The scanning current preferably has a sawtooth waveform to produce a cyclically progressively linearly increasing current. This progressively increasing scanning current produces a magnetomotive force which opposes that of the biasing current so it sequentially drives the cores of the various core devices from the initial state of saturation to the opposite state of saturation so the cores, which have a rectangular hysteresis characteristic as shown in FIG. 3, are momentarily driven through unsaturated states where, if the associated condition-responsive switches are open, they form core devices with an appreciable momentary inductive reactance.

Figure 5:
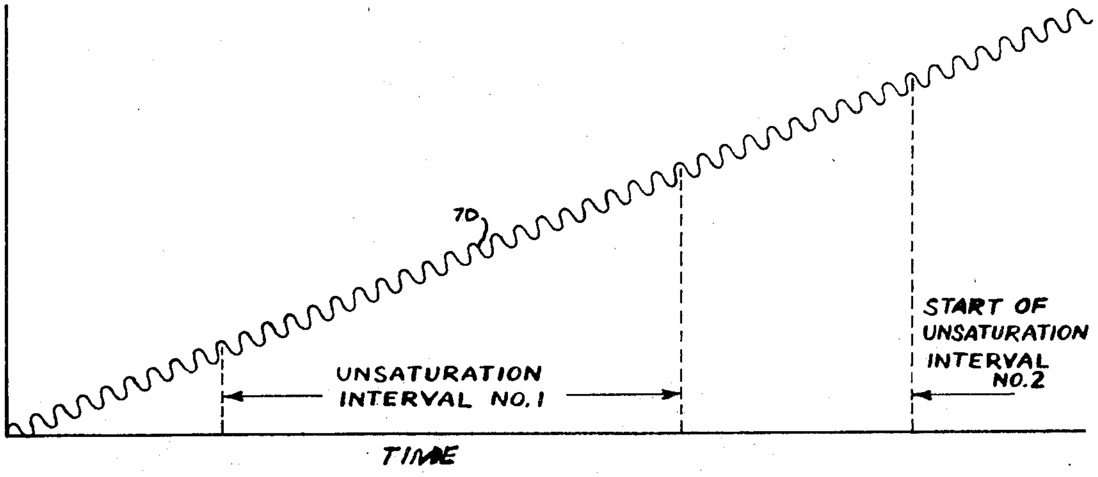
FIG. 5 illustrates the waveform of scanning current which is used in the preferred form of this invention.

In accordance with another aspect of the invention, there is provided a sine wave oscillator 51, which, continuously modulates the scanning current waveform by being superimposed on the linearly increasing scanning current from the scan current generator 50 as shown at 70*a* in FIG. 5. Such modulation may be achieved by an adder circuit 53 to produce at the output thereof a composite scanning signal 70 as illustrated in FIG. 5. The scan current generator 50 may be a conventional sawtooth wave generator synchronized from a timing or synchronizing pulse source 54. The discrete intervals of the scanning current waveform 70 at which the various cores become unsaturated sequentially are shown in FIG. 5. Note, that each of these intervals lasts preferably for a large number of cycles of the modulation frequency.

A signal output impedance 46 may be connected to the last scanning winding 44*c* to enable the sensing of output signal information. This impedance, which may be in the field or at the central control station, is coupled to the readout or annunciator 29 by capacitor 47 which decouples the scanning current therefrom. (The ground symbols in FIG. 2 and the other FIGS. indicate connections to common conductors rather than earth connections which are not generally desirable.) The value of the impedance 46 is made very low relative to the inductive reactance of each scanning winding when the associated core is driven through the unsaturated state (a saturated core provides a near zero inductive reactance therein until a core of a core device is unsaturated). Until a core is unsaturated, a signal at the modulation frequency appears across the load impedance 46. When a core is unsaturated and the associated switch 22 is open, the associated scanning winding presents a relatively large inductive reactance so that a relatively large voltage at the modulation frequency is developed across the scanning winding involved and a relatively insignificant voltage at this frequency is developed across the load impedance 46. Thus, the presence of an appreciable signal at the modulation frequency across the load impedance 46 at a point in time where the scanning current reaches a value which will normally unsaturate the core indicates that the associated condition-responsive switch 22 is open while the absence of such a signal indicates that the associated condition-responsive switch 22 is closed.

Figure 4:
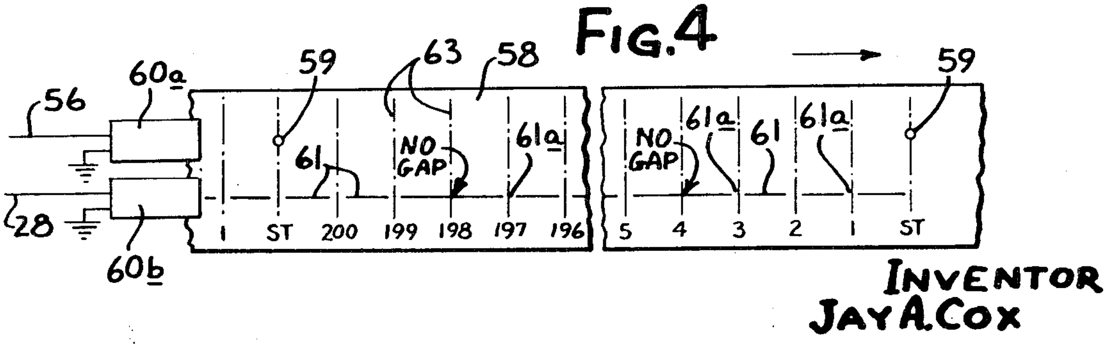
FIG. 4 is a diagrammatic representation of one kind of display readout which can be used to provide a permanent record of normal and abnormal conditions being monitored by the system of this invention.

The readout or annunciator means 29 is designed to give a visual indication of the variables which are abnormal during each scanning cycle. The scan current generator 50 and readout annunciator means may be operatively synchronized for identifying the time intervals during which the presence or absence of signals occur to provide the indication of these signals and the identification of the variables involved. However, in FIG. 4, a simplified version of the invention, a readout means in the form of a strip chart recorder 29 is provided at the central control station 12. Here a readout display is made on a moving tape 58 which passes in proximity to marking heads 60*a* and 60*b*. Marking head 60*b* is shown actuated by electric output signals on line 28 coupled through capacitor 47 form load impedance 46 in FIG. 2, and marking head 60*a* is shown actuated from the periodic sawtooth wave initiating pulses generated by the synchronizing pulse source 54 in FIG. 2. The marking head 60*a* produces a cycle beginning marker 59 on the tape 58 as it receives a pulse on the line 56. As long as all cores remain unsaturated, an appreciable modulation signal appears on load impedance 46 and line 28 which causes marking head 60*b* to produce a line 61. As a saturable core device is driven through an unsaturated state, the modulation signal disappears from the line 28 or reduces to a low value so a short gap 61*a* appears in the line 61. Such a short gap is absent in the line 61, such as at points 4 and 198 in FIG. 4, where the core device is associated with a switch 22 which is closed to prevent unsaturation of the core from having any effect on the inductance of the core device. (The tape has indicia lines 63 thereon which may be marked with numbers as indicated identifying the variables assigned to the various time intervals or current values of each scanning cycle or period represented by the portion of the tape between successive cycle beginning markers 59). It will be understood that the simplified readout means shown in FIG. 4 is by way of example and not by way of limitation and that any suitable readout means may be used in accordance with this invention.

Figure 6:
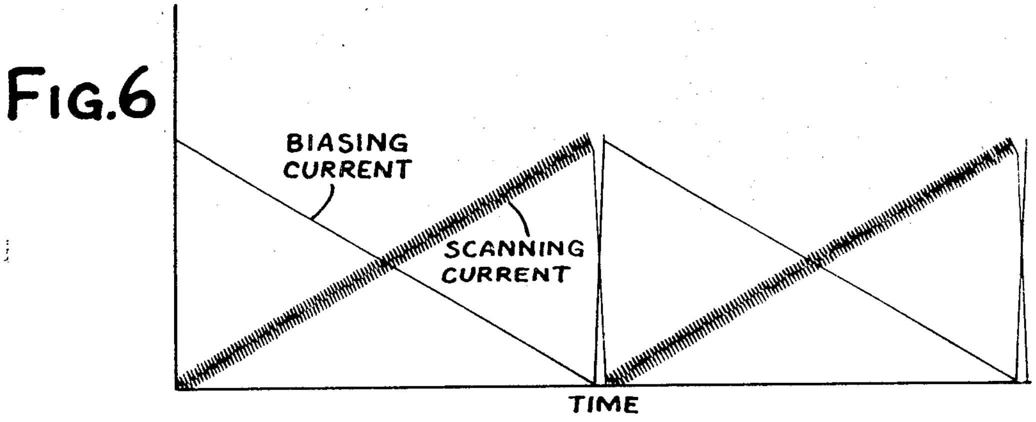
FIG. 6 is a graphic illustration of simultaneously varying biasing and scanning currents which are used in accordance with the preferred form of this invention.

In accordance with another aspect of the invention, the biasing current most advantageously is a linearly decreasing direct current produced by the bias current source 48 which current starts from a predetermined current value and decreases to zero simultaneously while the scanning current starts at zero and increases to a maximum predetermined current value which may be the same or a different current value with respect to the starting maximum current value of the biasing current, as illustrated in FIG. 6. The magnetomotive force generated by the flow of scanning current through the scanning windings progressively unsaturates the various cores but, unlike the case where the biasing current remains constant, does so with much smaller current increments because the biasing current progressively decreases. This greatly decreases the maximum amplitude of the current needed to unsaturate the core with the largest number of biasing winding turns. This reduces the cost size and weight of the core devices and the scanning and bias current sources since they can be designed to carry a smaller average or peak current. This aspect of the invention has application to a saturable core event-monitoring system of the type described whether or not modulation of the scanning current is carried out.

FIG. 7 illustrates an alternate less preferred form of the invention where the separate switch isolating windings 32*d*–44*d* are eliminated and the condition-responsive switches 22 are connected directly across the respective associated scanning windings. This arrangement may be used either with a linearly increasing scanning current or with a modulated current. Here, unlike the form of the invention of FIG. 2, the closure of a switch 22 bypasses the scanning current from the associated scanning winding so the associated core never becomes unsaturated and, more importantly, the winding is short circuited so no modulation frequency voltage appears thereacross. In the case where the scanning current is modulated, the modulation frequency will appear across the load impedance ans will be absent therefrom under the same conditions as explained in connection with the embodiment of FIG. 2. In the case where the scanning current is unmodulated, the closure of a condition-responsive switch is detected solely by the absence of a pulse generated in the scanning winding or other output winding when the scanning current reaches a value which normally causes a particular core to be moved unsaturated. Such a pulse appears across the load impedance 46 and is detected by the readout and annunciator means 29 used by the event-monitoring system.

FIG. 8 illustrates the most preferred form of this invention. Here a plurality of saturable core devices 32', 34', 36', etc. have their scanning windings 32*c*', 34*c*', 36*c*',etc. connected in series and their biasing windings 32*b*', 34*b*', 36*b*', etc. connected in series in the same manner as mentioned hereinabove. However, the number of turns in the scanning windings progressively decrease preferably by one turn from the first winding 32*c*', of core 32', which is assumed to have 200 turns, to the last winding 44*c*', which is assumed to have one turn, while the number of turns in the biasing winding progressively increase from the first winding 32*b*' of the first core 32', which is assumed to have one turn, to the last winding 44*b*' of core 44', which is assumed to have 200 turns.

This arrangement provides a fixed number of turns on each core so that the core devices will all act as identical inductances when the modulating component of the current flowing through these windings produce reinforcing magnetomotive forces. This aspect of the invention is useful whether or not the DC component of the biasing current is decreased with the increase in the scanning current since the variation in the biasing current is not necessary for the progressively increasing scanning current sequentially to drive the various cores through their unsaturated conditions as previously explained.

Figure 9:
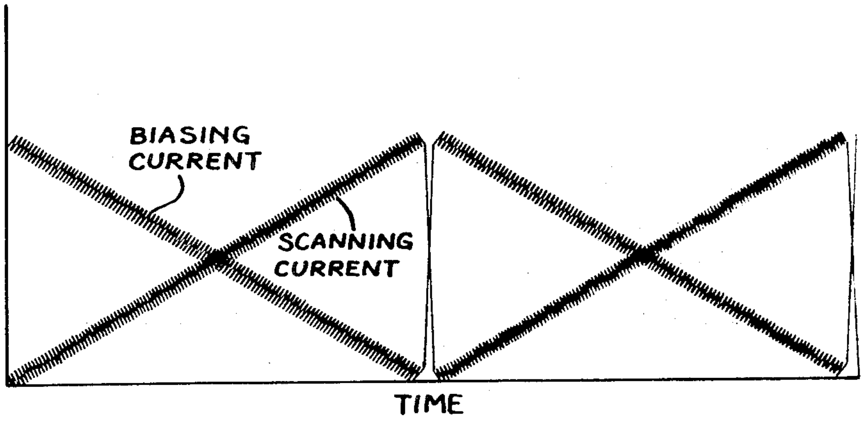
FIG. 9 are the waveforms of the scanning and biasing currents used in the forms of the invention in FIG. 8.

FIG. 9 shows the waveforms of modulated scanning and biasing currents formed so they respectively increase and decrease with time each scanning cycle to produce the reinforcing magnetomotive forces. The phase of the modulation applied to the scanning and biasing current should be 180° out of phase so that the modulating current component of one of the currents is increasing while that of the other current is decreasing. This is necessary because the DC component of these currents produce opposing magnetomotive forces. It is also necessary that the modulating signals sensed in common line impedances or devices connected in series with the scanning and biasing windings be added together to provide a single resultant signal.

To this end, and referring once again to FIG. 8, the DC bias source 48 utilized in the embodiment of FIG. 2 is replaced by a bias current generator 50' which generates a cyclic sawtooth waveform like the outline of the waveform for the biasing current shown in FIG. 9. This waveform is fed to an adding means 53' which also receives an output of the oscillator 51' which is 180° out of phase with the output fed therefrom to the adding means 53 which receives an output of the scanning current generator 50. The composite output of the adding means 53 and 53' are respectively fed in series with the aforementioned scanning windings 32*c*', 34*c*', 36*c*', etc. and the bias windings 32*b*', 34*b*', 36*b*', etc. The adding means 53 and 53' and their associated series connected windings are respectively connected to separate load impedances 46 and 46' across which the modulating signals will appear except when the associated cores are unsaturated or the associated condition-responsive switches are in their closed positions. Capacitors 47–47' couple the voltages appearing across load impedances 46 and 46' to an adding means 54 whose output is fed to the readout or annunciator means 29.

In the embodiment of FIG. 8, as in the embodiment of FIG. 2, the various condition-responsive switches are preferably connected directly across isolating windings 32*d*', 34*d*', 36*d*', etc.

Figure 10:
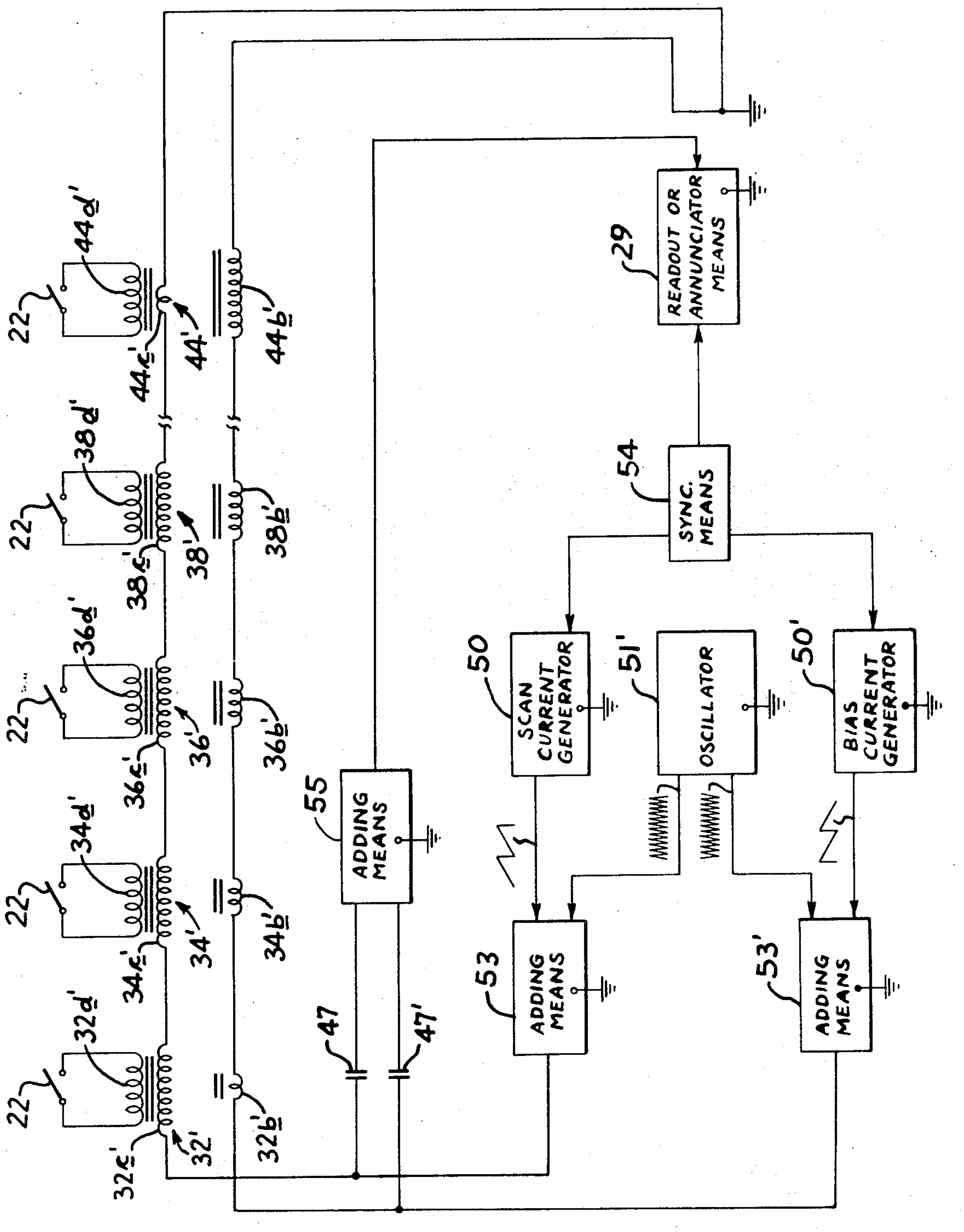
FIG. 10 illustrates the most preferred form of the invention where the signal-sensing circuit is in parallel with the scanning and biasing windings.

In the embodiments of the invention shown in FIGS. 2 and 8, it is assumed that the increase in the AC impedance of a core device being driven through an unsaturated state causes a substantial reduction in the AC component of the current flowing through the scanning windings. This requires that the adding means 53 and 53' be circuits having a low AC impedance relative to the maximum AC impedance of the core devices. This places a severe requirement on the design of the adding means 53 and 53' which is most desirably a high-impedance current source to provide a consistent sawtooth DC current waveform independent of small variations in DC current resistance in the circuit. This problem can be readily overcome so that, for example, a simple high-impedance transistor driver circuit may constitute the output of the adding means 53 and 53' by utilizing a parallel rather than a series connection of the means for sensing the presence or absence of a high AC impedance in the winding circuits. Thus, as shown in FIG. 10, the load resistors 46 and 46' of FIG. 8 are eliminated so the ends of the series connected scanning and biasing windings are connected directly to the same or different current return conductors and the capacitors 47 and 47' and the associated adding means 55 are connected in parallel to the current input sides of the scanning and biasing winding circuits to that the readout or annunciator means 29 senses directly the sum of any AC voltages developed in the winding circuits. Thus, as indicated in FIG. 10, the capacitor 47 is coupled between the left-hand terminal of the first scanning winding 32c' and one of the inputs to the adding means 55 and the capacitor 47' is coupled between the left-hand terminal of the first biasing winding 32b' and the other input to the adding means 55. It is thus apparent that at any given instant, the plates of the capacitor 47 and 47' connected to the adding means 55 will have no voltage present thereat as long as the cores of all of the core devices involved are saturated or the associated condition responsive switches are in their closed conditions because, in such case, the effective AC impedance across the scanning and biasing winding circuits will be substantially zero. When, however, a particular core becomes momentarily unsaturated and the associated condition responsive switch remains in an open condition, the modulating frequency component of the output of the adding means 53 and 53' will develop a voltage across the momentarily high-inductive reactance of the core device involved which voltage will be coupled through the capacitors 47 and 47' to the adding means 55. It is thus apparent that in the form of the invention shown in FIG. 10 is operable even when the AC impedance of the adding means 53 and 53' is desirably high since this high impedance has no effect on whether or not the circuit can sense the presence or absence of an inductive reactance across the scanning and winding circuits.

Accordingly, this invention provides several unique and novel ways of detecting normal and abnormal conditions of condition-responsive means which may be located many miles from a central control station and connected thereto by means of only a few wires. Also, this invention provides means for detecting which one of a plurality of condition-responsive means is in an abnormal condition. It will be understood that the variations and modifications of this invention may be made without departing from the spirit and scope of the novel concepts disclosed herein.

I claim:

1. An event-monitoring system for detecting the state of a number of conditions being monitored, said system comprising: a plurality of saturable core devices having winding means wound about respective saturable magnetic cores and connected in series with each other; means for initially saturating said cores in a given direction in progressively increasing degrees; scanning-current-generating means connected to said series connected winding means for cyclically providing a progressively increasing DC current modulated at a given frequency and providing a magnetomotive force opposing said saturation in a given direction for sequentially driving the cores from a saturated condition in said given direction through an unsaturated condition to the oppositely saturated condition, the time during which each core is in an unsaturated stare being at least a number of cycles of the modulating frequency, the driving of each magnetic core through said unsaturated producing a momentary detectable change in the inductance of the core device as determined by the presence of a voltage at said given frequency across the windings thereof; condition-responsive means respectively associated with each of said plurality of saturable core devices, each of said condition-responsive means being respectively in normal and abnormal conditions when the condition is respectively in normal and abnormal states and in one condition thereof inhibiting the presence of said voltage of said given frequency across the winding means of the core device involved; and time and electrical output-responsive means coupled with said winding means and responsive to the presence or absence of an output therein at said given frequency for identifying the saturable core device associated with a condition responsive means in an abnormal condition.

2. The event-monitoring system of claim 1 wherein each saturable core device includes a switch-isolating winding, said condition-responsive means associated with each core device being across the associated isolating winding to short circuit the same when in one of said normal and abnormal conditions to provide a reflected short circuit impedance in said winding means to inhibit the presence of said output of said given frequency.

3. The event-monitoring system of claim 1 wherein said saturating means is a baising current means connected to a separate group of series connected windings of said saturable core devices for providing a saturating magnetomotive force opposed by the magnetomotive force produced by said scanning current.

4. The event-monitoring system of claim 3 wherein said biasing current means provides a cyclically linearly decreasing biasing current passing through said separate group of series connected windings, wherein the magnetomotive force produced by said increasing scanning current necessary to unsaturate cores of the core devices is reduced.

5. The event-monitoring system of claim 3 wherein each of said cores of said saturable core devices is substantially identical with the other cores and the number of turns of each of said winding means in which scanning current flows is the same for all of the cores, and the number of turns of said windings in which said biasing current flows progressively increases from core to core.

6. The event-monitoring system of claim 3 wherein each of said cores of said saturable core devices is substantially identical with the other cores and the number of turn of said winding means in which scanning current flows have a progressively decreasing number of turns while said windings in which said biasing current flows have a progressively increasing number of turns so each core has approximately the same number of windings, and there is provided means for modulating said biasing current at said modulating frequency with the phase of the modulative frequency being such as to produce magnetomotive forces which reinforce that produced by the modulated component of said scanning current, and said time and electrical output-responsive means being responsive to the presence or absence of signals at the modulating frequency representing the sum of the signals produced by the voltages developed across the scanning current and bias current carrying windings of said cores.

7. The event-monitoring system of claim 3 wherein each of said cores of said saturable core devices is substantially identical with the other cores, and the number of turns of said windings in which said biasing current flows progressively increases from core to core.

8. The event-monitoring system of claim 1 wherein said time and electrical output-responsive means is coupled across said winding means.

9. The event-monitoring system of claim 6 wherein said time and electrical output-responsive means is coupled across said biasing and scanning current carrying windings.

10. An event-monitor system for detecting the state of a number of conditions being monitored, said system comprising: a plurality of saturable core devices each having at least first and second windings wound about a saturable magnetic core, said first windings being connected in series with each other and said second windings being connected in series with each other; biasing current means connected to said series connected second windings for cyclically applying thereto a progressively decreasing biasing current for initially saturating said cores in a given direction in progressively varying degrees; scanning current means connected to said series connected windings for cyclically applying thereto a progressively increasing scanning current for providing a magnetomotive force which opposes that produced by said biasing current for sequentially driving said core from a saturated condition in said given direction through an unsaturated condition to an opposite state of saturation to provide a detectable substantial change in an electrical output in the windings thereof; condition-responsive means respectively associated with each of said plurality of saturable core devices, each of said condition-responsive means being respectively in normal and abnormal conditions when the condition being monitored is respectively in normal and abnormal states and in one condition thereof inhibiting said electrical output of the associated saturable core device so said electrical output in said windings thereof is absent at the instant of time when the core would other wise be driven from it saturated condition; and time and electrical output-responsive means in common with windings of said core devices and responsive to the presence or absence of an electrical output in said windings at a given time for identifying the saturable core device associated with a condition-responsive means in an abnormal condition.

11. The event-monitoring system of claim 10 wherein each of said cores of said saturable core devices is substantially identical with the other cores and the number of turns of said winding means in which scanning current flows have a progressively decreasing number of turns while said windings in which said biasing current flows have a progressively increasing number of turns so each core has approximately the same number of windings.

* * * * *